United States Patent
Adeli et al.

(10) Patent No.: US 11,019,087 B1
(45) Date of Patent: May 25, 2021

(54) COMPUTER VISION-BASED INTELLIGENT ANOMALY DETECTION USING SYNTHETIC AND SIMULATED DATA-SYSTEM AND METHOD

(71) Applicants: Ehsan Adeli, Mountain View, CA (US); Joseph Zaki, Los Angeles, CA (US)

(72) Inventors: Ehsan Adeli, Mountain View, CA (US); Joseph Zaki, Los Angeles, CA (US)

( * ) Notice: Subject to any disclaimer, the term of this patent is extended or adjusted under 35 U.S.C. 154(b) by 0 days.

(21) Appl. No.: 16/688,902

(22) Filed: Nov. 19, 2019

(51) Int. Cl.
*H04N 7/18* (2006.01)
*H04L 29/06* (2006.01)
*G06N 5/02* (2006.01)
*G06N 3/00* (2006.01)
*G08B 29/18* (2006.01)

(52) U.S. Cl.
CPC ......... *H04L 63/1425* (2013.01); *G06N 3/006* (2013.01); *G06N 5/025* (2013.01); *G08B 29/185* (2013.01); *H04N 7/181* (2013.01)

(58) Field of Classification Search
CPC ........ H04N 7/181; G06N 3/006; G06N 5/025; G08B 29/185
USPC ....................................................... 348/143
See application file for complete search history.

(56) References Cited

U.S. PATENT DOCUMENTS

| | | | |
|---|---|---|---|
| 7,595,815 B2 | 9/2009 | Donovan et al. | |
| 9,960,929 B2 | 5/2018 | Fadell et al. | |
| 10,453,223 B2 * | 10/2019 | Cinnamon | G06T 17/30 |
| 2017/0214701 A1 | 7/2017 | Hasan | |
| 2018/0365089 A1 * | 12/2018 | Okanohara | G06N 7/005 |
| 2019/0197358 A1 * | 6/2019 | Madani | G16H 30/20 |
| 2019/0294871 A1 * | 9/2019 | Vaezi Joze | G06K 9/00369 |
| 2019/0353730 A1 * | 11/2019 | Griswold | G06N 20/00 |
| 2019/0354771 A1 * | 11/2019 | Kleinrock | G06K 9/00771 |
| 2019/0378263 A1 * | 12/2019 | Lai | G06K 9/6259 |
| 2020/0020038 A1 * | 1/2020 | Haile | H04L 9/3236 |
| 2020/0160502 A1 * | 5/2020 | Nie ner | G06K 9/00577 |
| 2020/0184200 A1 * | 6/2020 | Wang | G06K 9/00288 |
| 2020/0226752 A1 * | 7/2020 | Lee | A61B 5/7425 |

(Continued)

FOREIGN PATENT DOCUMENTS

KR 20180107930 10/2018

*Primary Examiner* — Michael Lee
(74) *Attorney, Agent, or Firm* — Omni Legal Group; Omid E. Khalifeh; Lara A. Petersen

(57) ABSTRACT

An intelligent system and method for anomaly, such as crime, detection is provided. In some embodiments, the system may comprise a computing device, defined by a generator and a discriminator, and at least one video camera. The generator may generate synthetic data and real data and, in turn, the discriminator may evaluate and classify the synthetic data and the real data as real or synthetic. In other embodiments, the computing device may be trained so as to classify the synthetic data and the real data as normal or anomaly. In further exemplary embodiments, the video camera may capture a plurality of live action events and generate video data, which the video camera may then transmit to the computing device. The computing device may then classify the live action events as normal or anomaly. In embodiments where the live action events may be classified as anomaly, an appropriate authority may be notified so as to provide decreased response times and ultimately, improve safety and prevent crimes.

15 Claims, 5 Drawing Sheets

(56) References Cited

U.S. PATENT DOCUMENTS

2020/0312007 A1* 10/2020 Liu ..................... G06N 3/0454
2020/0312042 A1* 10/2020 Sardari .................. G06T 17/00

* cited by examiner

COMPUTER VISION-BASED INTELLIGENT ANOMALY DETECTION USING SYNTHETIC AND SIMULATED DATA-SYSTEM AND METHOD

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to intelligent systems and methods and, more particularly, to a computer vision-based intelligent anomaly detection system and method wherein synthetic data and real data are implemented to train a computing device to detect anomalies, such as crimes, in a bias-free manner so as to provide an enhanced likelihood of responding to the anomaly desirably.

BACKGROUND

Artificial intelligence (AI) is the simulation of human intelligence processes by machines, including computer systems. These intelligence processes include learning, reasoning, and self-correction. Data is the foundational element that provides AI its abilities. In particular, well-curated and properly-annotated datasets enable AI models to be trained and learn complicated tasks. Computer vision is a subfield of artificial intelligence that seeks to develop techniques to help computers receive and understand the content of digital images, such as photographs and videos. Indeed, computer vision is the ability of computers to process images and extract meaningful features therefrom for the purpose of completing certain tasks.

While computer vision provides the potential for rapid detection and control of a number of situations, events, or activities, one primary drawback is that its methods require vast amounts of data in order to be adequately trained. In many instances, it is extremely difficult to gather large enough datasets to train models. Moreover, even if the dataset is sufficient in size, the model may nonetheless remain prejudiced based on the type of data to which it has been provided. Thus, any practical application or effect of AI will only be as good as the quality of data collected. There remains a need for a system and method for training bias-free models, that is, a model which takes into account all races and sexes.

One potential application of AI and computer vision is for anomaly and crime detection. However, until now, there has been no effective, bias-free means to detect anomalies and crime using AI and computer vision. In particular, these scenarios are rare by nature. Due to the scarce nature of this type of data, any anomaly or crime data that may be gathered will likely be skewed toward one or more genders or races. Therefore, it remains burdensome to gather usable data from these activities. As a result, there remains a need for crime and anomaly detection using machine learning.

SUMMARY

The present disclosure is directed to an intelligent system and method, which provides for a computing device capable of bias-free anomaly detection so as to efficiently and effectively respond to the anomaly. In many embodiments, and for purposes of brevity, the system and method for anomaly detection featuring detection of criminal activity is shown and described, however, it will be understood that "anomaly" may include virtually any type of abnormal behavior, event, activity, or situation which deviates from what is standard, normal, or expected. Moreover, throughout this discussion, the system and method is described as using artificial intelligence human behavior recognition, and in particular, domain adaptation and generative adversarial networks to train the computing device to recognize anomalies, such as criminal behaviors. However, it will be understood by someone of ordinary skill in the art that this intelligent system and method may utilize any known approach in accordance herewith.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, an intelligent anomaly detection system is provided that may utilize the computing device, which may be defined by a generator and a discriminator. The generator may be operative to generate synthetic data and real data and transmit the synthetic data and the real data to the discriminator. The synthetic data may be generated by the generator so as to closely resemble the real data. In turn, the discriminator may be operative to receive the synthetic data and the real data from the generator. Also, the discriminator may be operative to evaluate the synthetic data and the real data and classify the synthetic data and the real data as real or synthetic. Indeed, the goal of the discriminator may be to accurately determine the authenticity of the real data and the synthetic data. On the other hand, the goal of the generator may be to generate the synthetic data so as to be indistinguishable from the real data.

The synthetic data may be defined by at least one normal simulation and at least one anomaly simulation while the real data may be defined by at least one normal incident and at least one anomaly incident. The anomaly simulation and the anomaly incident may comprise an environment, at least one actor, and at least one anomaly behavior. The environment may be indoor or outdoor and the at least one actor may be a human, an animal, or an inanimate object.

In certain exemplary embodiments, the anomaly simulation and the anomaly incident may represent a criminal activity or behavior. In such embodiments, the at least one anomaly behavior may be a criminal behavior. Moreover, the criminal behavior may comprise any crime, as defined by relevant state, federal, or foreign statute, rule, or law. For instance, the criminal behavior may be murder, assault, rape, arson, or robbery. In alternate embodiments, the anomaly behavior may be a health emergency, a natural or artificial disaster, or other non-standard behavior.

The normal simulation and the normal incident may represent a normal activity or behavior, that is, an activity that is standard, ordinary, uninteresting, or that occurs daily or on a regular basis. The normal simulation and the normal incident may comprise an environment, which, as before, may comprise an indoor space or an outdoor space. In other embodiments, the normal simulation and the normal incident may also comprise at least one actor and at least one normal behavior. As before, the at least one actor may be a human, animal, or object. Further, in some embodiments, the normal simulation and the normal incident may represent a lack of activity, that is, the environment with no movement or other occurrences. In certain exemplary embodiments, the environment of the normal incident and the normal simulation may be the same or substantially equivalent to the environment of the anomaly incident and the anomaly simulation. In other embodiments, the respective environments may differ.

In some embodiments, the computing device may be operative to generate the synthetic data, which may be defined by at least one normal simulation and at least one anomaly simulation. The computing device may then be operative to classify the normal simulation and the anomaly simulation as normal or anomaly. Additionally, instead of generating the real data itself, the computing device may receive the real data, which may be defined by at least one normal incident and at least one anomaly incident. In some embodiments, the computing device may receive the real data from an external source, such as another computing device. The computing device may also be operative to classify the normal incident and the anomaly incident as normal or anomaly.

The system may further comprise a video camera, which may be operative to capture a plurality of live action events in real time. In certain embodiments, the video camera may capture video input as well as audio input. In other embodiments, the video camera may only capture still-frame images. In still other embodiments, the video camera may capture only audio input. The video camera may also be operative to generate video data defined by the plurality of live action events and transmit the video data to the computing device.

In embodiments wherein the system may comprise the video camera, the computing device may be further operative to receive and analysis the video data from the video camera. The computing device may then also classify the live action events as anomaly or normal. The anomaly or normal classification may be in accordance with the standards trained by the synthetic data and the real data. More particularly, the live action events may be classified as anomaly if the computing device would have classified the synthetic data or the real data as anomaly. Moreover, the live action events may be classified as normal if the computing device would have classified the synthetic data or the real data as normal.

Additionally, in embodiments wherein the computing device may classify a live action event as anomaly, the computing device may notify an appropriate authority. The appropriate authority may be virtually any human being. In some embodiments, the appropriate authority may be a local police, fire, or other first responder. In alternate embodiments, the appropriate authority may be an emergency or non-emergency healthcare professional, such as a doctor or an emergency medical technician/ambulance service. In yet other embodiments, the appropriate authority may be a property owner, who may own or control the video camera.

In one embodiment of the present invention, a computer-implemented method may be used to detect anomalies, such as crimes. The method may comprise the steps of providing a computing device defined by a generator and a discriminator; generating, at the generator, synthetic data; using, at the generator, real data; transmitting, at the generator, the synthetic data and the real data to the discriminator; receiving at the discriminator, the synthetic data and the real data from the generator; evaluating, at the discriminator, the synthetic data and the real data; and classifying, at the discriminator, the synthetic data and the real data as real or synthetic.

Initially, the generator may generate the synthetic data and the real data. The synthetic data may be defined by the at least one normal simulation and the at least one anomaly simulation. Similarly, the real data may be defined by the at least one normal incident and the at least one anomaly incident. The anomaly simulation and the anomaly incident may further comprise an environment, at least one actor, and at least one anomaly behavior, as discussed above with regard to the system of the present invention. Also as discussed above, the normal simulation and the normal incident may comprise an environment, at least one actor, and at least one normal behavior. A person of ordinary skill in the art will recognize that the anomaly simulation and the anomaly incident may represent any number of non-standard scenarios, including a criminal activity. One of ordinary skill in the art will further understand that the normal simulation and the normal incident may represent virtually any regular, mundane, day-to-day activity.

The synthetic data and the real data may then be transmitted by the generator to the discriminator. The discriminator, in turn, may receive the synthetic data and the real data and may then classify the synthetic data and the real data as real or synthetic. In this manner, the discriminator may be trained to accurately distinguish between the synthetic data and the real data. Further, in certain embodiments, the discriminator may also be trained to generate the synthetic data so as to resemble the real data.

In further embodiments, the method may further comprise the steps of providing a video camera; capturing, at the video camera, a plurality of live action events; generating, at the video camera, video data; transmitting, at the video camera, the video data to the computing device; generating, at the computing device, synthetic data defined by at least one normal simulation and at least one anomaly simulation; classifying, at the computing device, the normal simulation and the anomaly simulation as normal or anomaly; receiving, at the computing device, the real data; classifying, at the computing device, the normal incident and the anomaly incident as normal or anomaly; receiving, at the computing device, the video data from the video camera; classifying, at the computing device, the live action events as normal or anomaly; and responsive to an anomaly live action event, at the computing device, notifying an appropriate authority.

In these embodiments, the video camera may capture the plurality of live action events, which may define the video data. In addition, in some embodiments, the video camera may capture the plurality of live action events in real time. In other embodiments, the video camera may capture the plurality of live action events after a time delay. The plurality of live action events may comprise an anomaly incident or a normal incident. In further embodiments, the anomaly incident may be a criminal activity, a health emergency, or a natural disaster. Upon capturing the live action events, the video camera may then transmit the video data to the computing device.

The computing device may generate synthetic data, which may be defined by the at least one normal simulation and the at least one anomaly simulation. In some embodiments, the computing device may then classify the normal simulation and the anomaly simulation as normal or anomaly. The normal simulation and the anomaly simulation may be classified as normal when the normal simulation or the anomaly simulation involve standard, regular, ordinary events or activities. Oppositely, the computing device may classify the normal and anomaly simulations as anomaly when a specified non-standard event, action, or happening occurs, such as a crime, medical emergency, or natural disaster.

Then, the computing device may receive the real data, which may be defined by the at least one normal incident and the at least one anomaly incident. In certain embodiments, the computing device may then classify the normal incident and the anomaly incident as normal or anomaly. The normal incident and the anomaly incident may be classified as normal when the normal incident or the anomaly incident involve standard, regular, ordinary events or activities. Similar to the synthetic data, the normal and anomaly incidents may be classified by the computing device as anomaly when a specified non-standard occurrence takes place.

Finally, the computing device may receive the video data from the video camera. The computing device may then, in turn, classify the live action events as normal or anomaly, per the standards set forth with regard to the synthetic data and the real data. Upon classification of the live action events as anomaly by the computing device, an appropriate authority may then be notified. For instance, the appropriate authority may be a local government agency, such as police, fire department, or emergency medical personnel. As another example, the appropriate authority may be a proper owner associated with the video camera or an environment from which the video camera captures the plurality of live action events. A person of ordinary skill in the art will recognize that the appropriate authority may depend on the type of anomaly of the live action events.

One or more of the above-disclosed embodiments, in addition to certain alternatives, are provided in further detail below with reference to the attached figures. The disclosed subject matter is not, however, limited to any particular embodiment disclosed.

Figure 1:
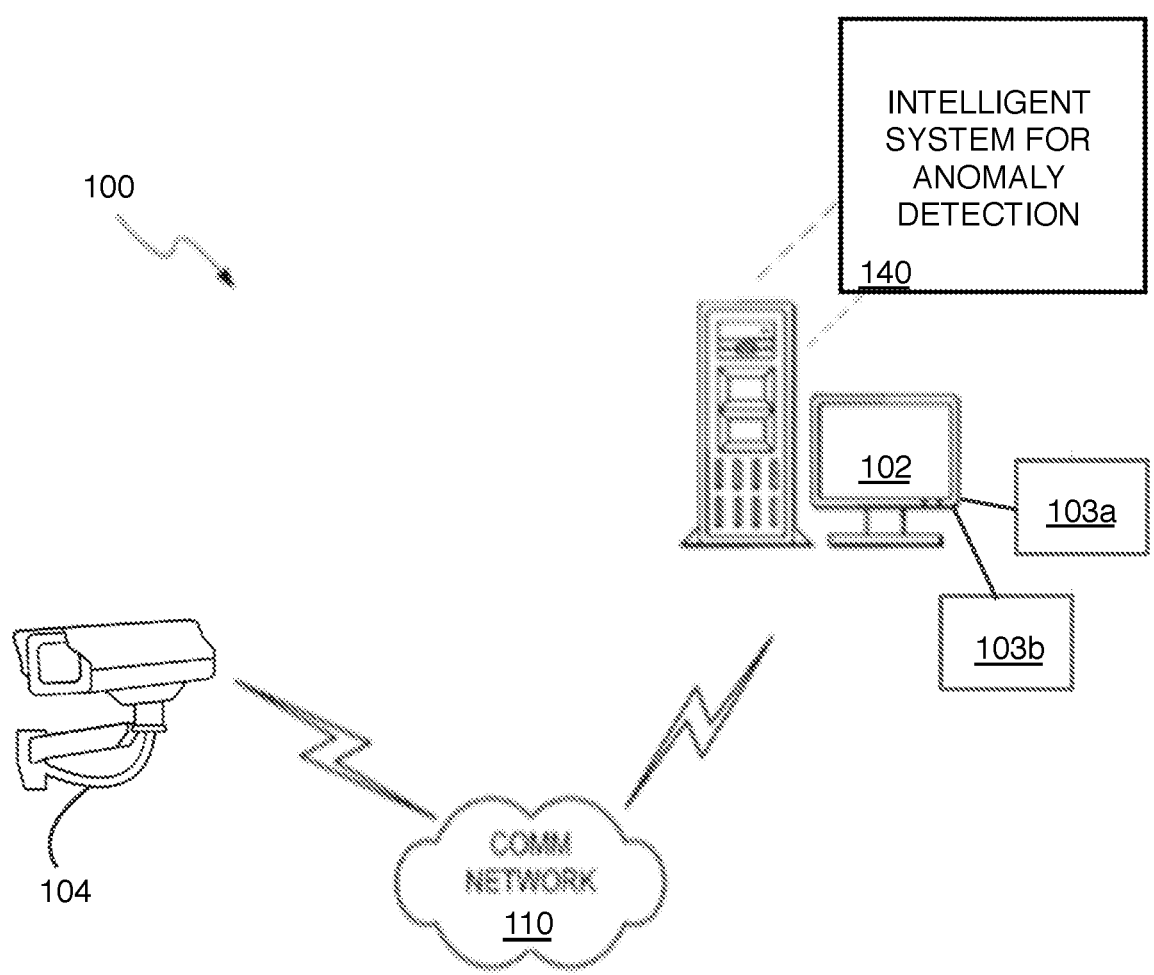
FIG. 1 shows an embodiment of the intelligent anomaly detection system.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

An intelligent system and method for anomaly detection is provided that, in some embodiments, may improve crime detection and decrease response times, thereby improving safety. The system and method may involve anomaly detection and may particularly feature crime detection. However, the term "anomaly" is used throughout the remainder of this disclosure and should be understood to include any type of abnormal incident, occurrence, or behavior. The system and method may permit particular crimes or anomalies to be targeted and eliminated, or the negative effects thereof to be reduced, by isolating specific criminal behaviors.

FIG. 1 is illustrative of a networked environment 100 in which another exemplary embodiment of an intelligent system for anomaly detection is implemented. As shown in FIG. 1, system 140 may comprise a computing device 102, which further comprises a generator 103a and a discriminator 103b, and a video camera 104. By way of example, and not limitation, the computing device 102 and the video camera 104 are shown communicatively coupled via a communication network 110. The computing device 102 may be embodied as a desktop or laptop computer that incorporates Wi-Fi, or even wired, functionality. As another example, the computing device 102 may be embodied as a mobile computing device such as, by way of example and without limitation, a smartphone that incorporates cellular telephone functionality. Moreover, the video camera 104 may be embodied as a standard digital video camera or camcorder known to those skilled in the art or any other type of device capable of capturing live events. In addition, in some embodiments, the system 140 may comprise more than one video camera 104 or even a system of video cameras. In such embodiments, the system of video cameras 104 may be pre-existing. The video camera 104 may incorporate cellular or Wi-Fi functionality. Notably, the communications network 110 can use one or more of various communications types such as, for example and without limitation, wired, cellular and Wi-Fi communications. Moreover, each of the computing device 102 and the video camera 104 may be coupled to a power supply, which may be effectuated by way of a power cord, battery, or other means of supplying electrical power as may be available or otherwise desired.

The computing device 102 and the video camera 104 or cameras, as the case may be, may become members of a network that enables each to interact with one another and exchange information, such as video data. In this exemplary embodiment, the network may be facilitated by a website that is hosted by a network server 120. As such, the server 120 may facilitate interaction among a limited group of members, as may be established by the members themselves. For the purpose of the example presented in FIG. 1, the limited group of members includes the computing device 102 and the video camera 104.

If embodied in software, it should be noted that each block depicted in the accompanying flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as the computing device 102. The machine code may be converted from the source code, etc. If embodied in hardware, each block may represent a circuit or a number of interconnected circuits to implement the specified logical function(s).

In some embodiments, the computing device 102 may comprise the generator 103a and the discriminator 103b. The generator 103a may be operative to generate synthetic data and real data. The generator 103a may also be operative to transmit the synthetic data and the real data to the discriminator 103b. In certain embodiments, the synthetic data may be generated so as to closely resemble the real data. Indeed, in some embodiments, the generator 103a may generate the synthetic data so as to appear nearly identical to the real data so as to fool the discriminator 103b into determining that the synthetic data is real.

The synthetic data may be defined by at least one normal simulation and at least one anomaly simulation. The normal simulation may comprise at least an environment. In certain embodiments, the environment may be outdoors, such as an urban area, suburban area, rural area, nature, or any other environment. In alternate embodiments, the environment may be indoors. For example, in such embodiments, the environment may be a person's residential property, a commercial area, such as a business, a residential common area, such as an apartment lobby or parking garage, or even, a person's vehicular interior or exterior. Moreover, the environment may comprise virtually any environment.

In some embodiments, the normal simulation may further comprise at least one actor and at least one normal behavior. The at least one actor may be human or animal. Further, the at least one actor may comprise an inanimate object. According to certain exemplary embodiments, the at least one actor may be engaging in an activity or be interacted with. Indeed, the at least one actor may engage in the at least one normal behavior. The at least one normal behavior may comprise a regular, ordinary, commonplace, or even day-to-day activity, incident, event, or occurrence. By way of example, the at least one normal behavior may comprise the actors talking, touching, playing, or fighting. In other embodiments, the at least one normal behavior may comprise or be in response to an animate or inanimate object, animals, weather, or other forces, whether natural or artificial. Further, in some embodiments, the at least one normal behavior may comprise the absence of behavior. It will be understood by a person of ordinary skill in the art that the at least one normal behavior may and should comprise a behavior, which would not give rise to a need for response.

In certain embodiments of the present invention, the at least one anomaly simulation may contrast the at least one normal simulation. In particular, the at least one anomaly simulation may comprise an environment, at least one actor, and at least one anomaly behavior. In accordance with some embodiments, the environment and the at least one actor of the at least one anomaly simulation may be the same as the environment and the at least one actor of the at least one normal simulation. In alternate embodiments, the environment and the at least one actor of the at least one anomaly simulation may differ from the environment and the at least one actor of the at least one normal simulation.

The at least one anomaly behavior may be defined by a criminal behavior. In some instances, the criminal behavior may be defined by a crime, as set forth by applicable state, federal, or foreign statute, rule, ordinance, regulation, or law. As examples, the criminal behavior may comprise murder, assault, battery, mayhem, maim, arson, robbery, burglary, or kidnapping. One of ordinary skill in the art will recognize that the criminal behavior may comprise any crime and may even comprise an attempted crime or other suspicious behavior. In further embodiments, the at least one anomaly behavior may comprise a natural or artificial disaster, such as a tornado, hurricane, blizzard, monsoon, flood, earthquake, or even more moderate weather, such as heavy winds or rain. In still further embodiments, the at least one anomaly behavior may be a health emergency, such as the at least one actor having a heart attack, stroke, passing out, or otherwise. collapsing. The at least one anomaly behavior may comprise any other non-standard, abnormal, or even suspicious, behavior.

Similarly, the real data may be defined by at least one normal incident and at least one anomaly incident. Per some embodiments, the principles, qualities, and features set forth above with regard to the at least one anomaly simulation may apply to the at least one anomaly incident. Indeed, in many embodiments, the generator may generate the anomaly simulation so as to closely resemble, or appear nearly identical to, the anomaly incident. The at least one anomaly simulation may comprise an environment, at least one actor, and at least one anomaly behavior, as discussed in detail above.

Moreover, the at least one normal incident may also closely resemble, appear nearly identical to, or share many, if not all, of the same features and elements of the at least one normal simulation. In other embodiments, the at least one normal incident and the at least one normal simulation may differ. However, the at least one normal incident may comprise an environment, and in some embodiments, at least one actor and at least one normal behavior.

The discriminator 103*b* may be operative to receive the synthetic data and the real data as generated by and transmitted from the generator 103*a*. In alternate embodiments, the discriminator 103*b* may be operative to receive the synthetic data and the real data from an external source, such as another computing device. The discriminator 103*b* may be operative to evaluate the synthetic data and the real data. More specifically, the discriminator 103*b* may evaluate and compare the anomaly simulation and the anomaly incident. Further, the discriminator 103*b* may evaluate and compare the normal simulation and the normal incident.

The discriminator 103*b* may be further operative to classify the synthetic data and the real data as real or synthetic.

In some embodiments, the discriminator 103*b* may accurately classify the synthetic data and the real data as real or synthetic. In other embodiments, and more particularly those embodiments wherein the synthetic data may closely resemble or be nearly identical to the real data, the discriminatory 103*b* may inaccurately classify the synthetic data as real. In this manner, the discriminator 103*b* may be trained to accurately recognize anomaly behavior as it may appear in video data which may be received from the video camera 104.

According to certain exemplary embodiments of the present invention, the computing device 102 may be operative to generate the synthetic data. The computing device may be further operative to receive the real data from an external source, such as another computing device. In such embodiments, as before, the synthetic data may be defined by at least one normal simulation and at least one anomaly simulation and the real data may be defined by that at least one normal incident and the at least one anomaly incident.

Further, in these embodiments, the computing device 102 may be operative to classify the normal simulation, the anomaly simulation, the normal incident, and the anomaly incident as normal or anomaly. In some embodiments, the computing device 102 may accurately classify the normal simulation and the normal incident as normal and the anomaly simulation and the anomaly incident as anomaly. In other embodiments, the computing device 102 may inaccurately classify the anomaly simulation and the anomaly incident as normal. Even further, the computing device 102 may accurately classify any, but not all, of the normal simulation, the normal incident, the anomaly simulation, and the anomaly incident.

The video camera 104 may be operative to capture a plurality of live action events. The live action events may comprise natural, that is, candid behavior, activities, or occurrences. Further, in certain embodiments, the live action events may comprise an anomaly behavior, such as a criminal behavior or activity. Alternatively, the live action events may comprise a normal behavior or even, no behavior. In such embodiments wherein the live action events may comprise no behavior, the live action events may simply comprise an environment, which may be empty.

In some embodiments, the video camera may be operative to capture the live action events in real-time. In other embodiments, the video camera may be operative to capture the live action events after a time delay. In capturing the live action events, the video camera 104 may be operative to capture video input as well as audio input. In some embodiments, however, the video camera 104 may only capture video input, which may be capture in black-and-white or color. In still other instances, the video camera 104 may be operative to capture only still-frame images or audio input. In addition, the video camera 104 may be further operative to generate video data, which may be defined by the plurality of live action events. A person of ordinary skill in the art will recognize that the video camera 104 may be any standard video camera known in the art, including a digital video recorder, a camcorder, or a surveillance video recorder. The video camera 104 may finally be operative to transmit the video data to the computing device.

The computing device/discriminator may classify the live action events as normal or anomaly. According to the same standards by which the discriminator may have been previously trained to classify the anomaly simulation, the normal simulation, the anomaly incident, and the normal incident, the discriminator (or the computing device, as the case may be) may classify the video data from the video camera. More particularly, the computing device may be operative to classify the live action events as normal if the computing device may have classified the normal incident and the normal simulation as normal. Additionally, the computing device may be operative to classify the live action events as anomaly if the computing device may have classified the anomaly incident and the anomaly simulation as anomaly.

In embodiments where the computing device may have classified the live action event as anomaly, the computing device may be further operative to notify an appropriate authority. In this way, the system may provide improved response times as well as a more effective response to the anomaly live action event. As discussed above, the appropriate authority may depend on the type of live action event. In one embodiment, the appropriate authority may be a first responder, such as police, firefighters, or emergency medical personnel. In alternate embodiments, the appropriate authority may be a property owner who owns or leases the video camera 104 or real property connected thereto. In further embodiments, the appropriate authority may be a designated emergency contact or any other human being capable of responding appropriately to the live action events.

Figure 2:
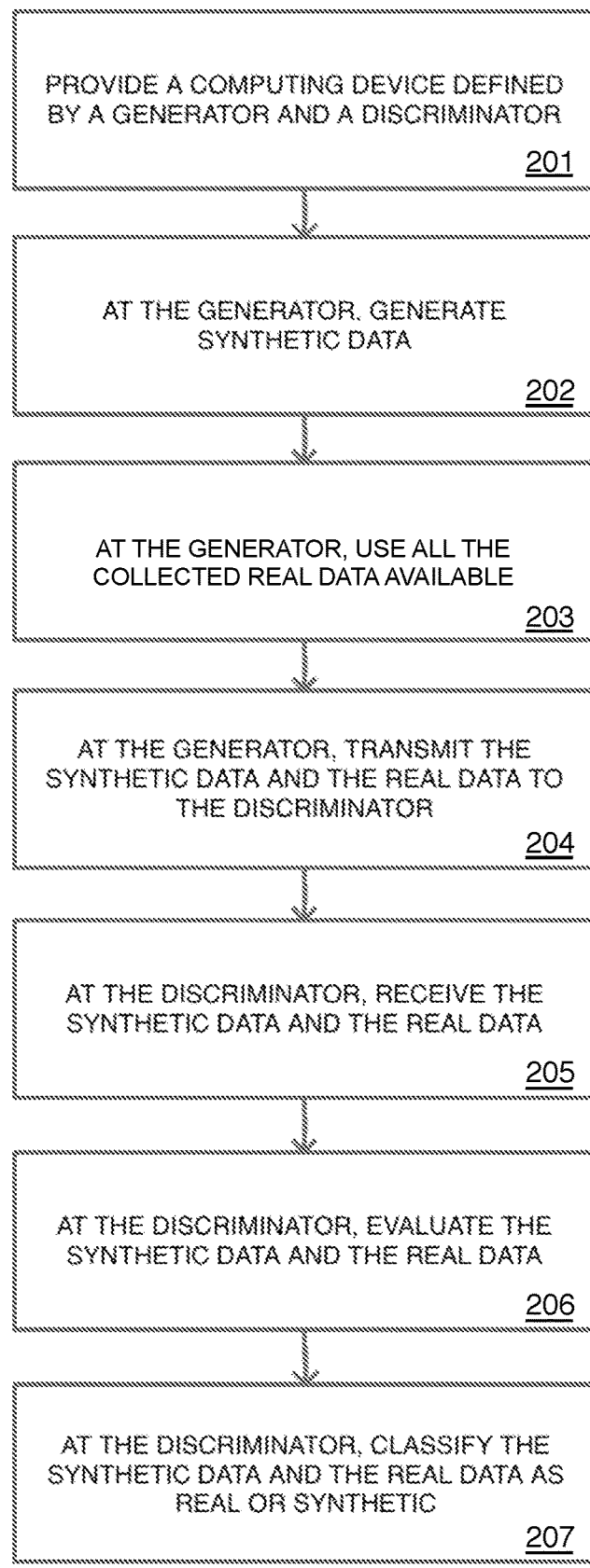
FIG. 2 shows an embodiment of the intelligent anomaly detection method.

FIG. 2 is a flowchart depicting an exemplary embodiment of an intelligent system and method for anomaly detection, such as may be performed by the computing device 102 and the video camera 104 of FIG. 1. As shown in FIG. 2, the method may include the steps of: providing a computing device defined by a generator and a discriminator (block 201); generating, at the generator, synthetic data (block 202); using, at the generator, real data (block 203); transmitting, at the generator, the synthetic data and the real data to the discriminator (block 204); receiving at the discriminator, the synthetic data and the real data from the generator (block 205); evaluating, at the discriminator, the synthetic data and the real data (block 206); and classifying, at the discriminator, the synthetic data and the real data as real or synthetic (block 207).

Generating synthetic data at the generator (block 202) may further comprise generating synthetic data defined by at least one normal simulation and at least one anomaly simulation. The normal simulation may comprise an environment, which, as discussed above, may comprise an urban area, suburban area, or rural area. In some embodiments, the normal simulation may further comprise at least one actor, which may be a human, animal, or inanimate object, and at least one normal behavior. According to certain embodiments of this invention, the normal behavior may comprise any mundane, commonplace behavior which a person of ordinary skill in the art will understand may include any behavior which would cause a reasonable person no cause for concern. On the other hand, the anomaly simulation may comprise an environment, at least one actor, and at least one anomaly behavior. In certain exemplary embodiments, the anomaly behavior may be a criminal behavior or activity, such as murder, rape, assault, battery, kidnapping, or arson.

Similar to generating the synthetic data (block 202), using all the collected real data at the generator (block 203) may further comprise utilizing all collected real data available. In certain embodiments, generating real data at the generator may also comprise generating real data defined by at least one normal incident and at least one anomaly incident. In some embodiments, the real data may comprise real-life incidents. In other embodiments, real data may comprise, at least in part, synthetic simulations. As with the normal simulation, the normal incident may further comprise an environment. In addition, in some embodiments, the normal incident also comprises at least one actor and at least one normal behavior, which may be any standard, commonplace activity or behavior. Moreover, as with the anomaly simulation, the anomaly incident may comprise an environment, at least one actor, and at least one anomaly behavior, which may variously be a crime, a natural disaster, a medical emergency, or any other rare occurrence, which may prompt a reasonable person to respond. In certain embodiments, the anomaly simulation and the anomaly incident, as well as, the normal simulation and the normal incident, may be highly similar, if not nearly identical. In others, the simulations may differ from the incidents.

Evaluating the synthetic data and the real data at the discriminator (block 206) may involve comparing the normal simulation and the normal incident. Further, evaluating the synthetic data and the real data (block 206) may involve comparing the anomaly simulation and the anomaly incident. In embodiments wherein the discriminator may determine that the normal simulation is highly similar or nearly identical to the normal incident, the discriminator may then classify the normal simulation, and therefore the synthetic data, as real (block 207). Similarly, in embodiments wherein the discriminator may determine that the anomaly simulation is highly similar or nearly identical to the anomaly incident, the anomaly simulation, and therefore the synthetic data, may then be classified by the discriminator as real (block 207). One of ordinary skill in the art will recognize that, in accordance with this method, the discriminator may classify any of the anomaly simulation, the normal simulation, the anomaly incident, and the normal incident as real or authentic (block 207) depending on the discriminator's evaluation thereof (block 206).

In certain embodiments, the method illustrated in FIG. 2 may be repeated in order to train the discriminator to accurately distinguish between the synthetic data and the real data. Indeed, in these embodiments, the goal of the discriminator may be to accurately classify the synthetic data as synthetic and the real data as real. Additionally, in some embodiments, the method of FIG. 2 may be repeated so as to train the generator to accurately generate the synthetic data and the real data so as to be indistinguishable by the discriminator.

Figure 3:
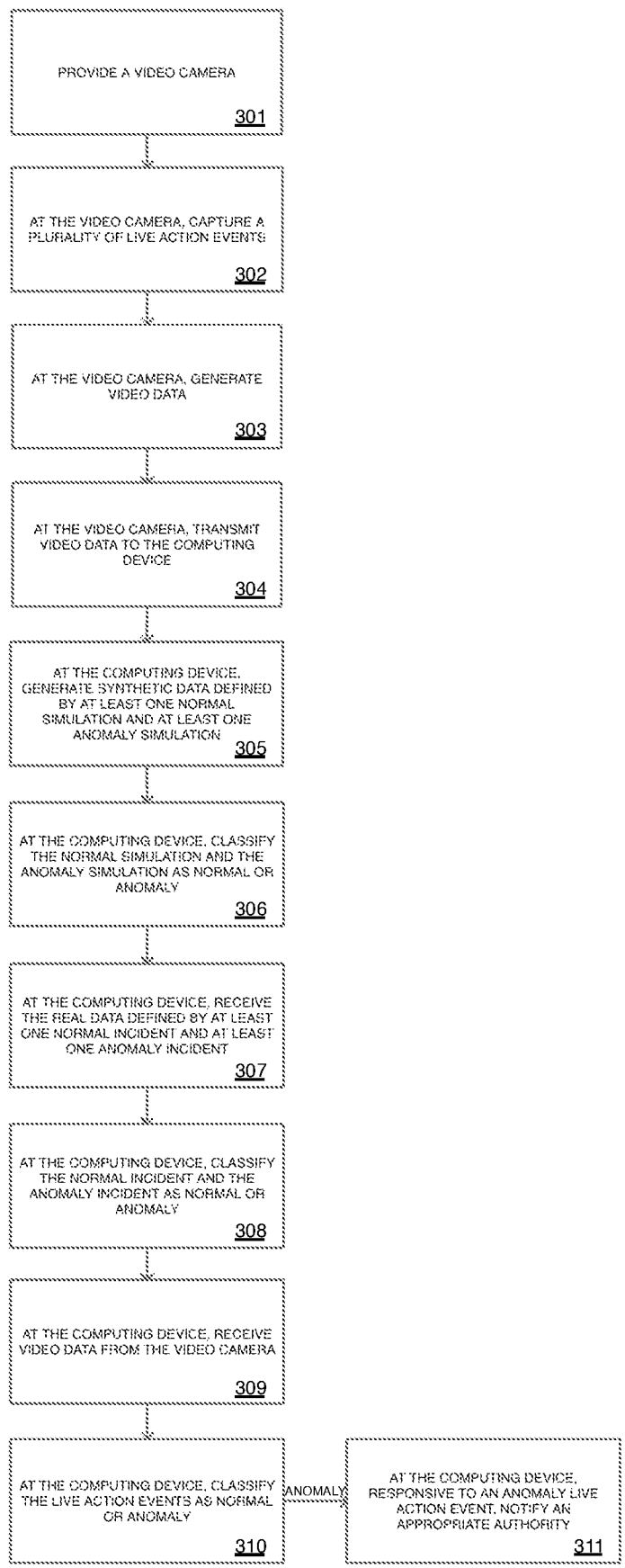
FIG. 3 shows an embodiment of the intelligent anomaly detection method.

According to some exemplary embodiments, the system and method may further comprise a video camera. FIG. 3 is a flowchart depicting such exemplary embodiment of a system and method for anomaly detection. This exemplary method may include the steps of: providing a video camera (block 301); capturing, at the video camera, a plurality of live action events (block 302); generating, at the video camera, video data (block 303); transmitting, at the video camera, the video data to the computing device (block 304); generating, at the computing device, synthetic data defined by at least one normal simulation and at least one anomaly simulation (block 305); classifying, at the computing device, the normal simulation and the anomaly simulation as normal or anomaly (block 306); receiving, at the computing device, the real data defined by at least one normal incident and at least one anomaly incident (block 307); classifying, at the computing device, the normal incident and the anomaly incident as normal or anomaly (block 308); receiving, at the computing device, the video data from the video camera (block 309); classifying, at the computing device, the live action events as normal or anomaly (block 310); and responsive to an anomaly live action event, at the computing device, notifying an appropriate authority (block 311).

The plurality of live action events which may be captured at the video camera (block 302) in real time or after a time delay. Similar to the normal and anomaly simulations and incidents, the live action events may comprise an environment, at least one actor, and either or both of an anomaly behavior or a normal behavior. In some embodiments, the live action events may comprise simply an environment, with no actor or behavior. In alternate embodiments, the live action events may comprise an environment and the at least one actor but no behavior. In embodiments wherein the live action events comprise the normal behavior, the normal behavior may comprise any commonplace, mundane, standard behavior. Alternatively, in embodiments wherein the live action events comprise the anomaly behavior, the anomaly behavior may comprise a crime, a medical emergency, a natural disaster, or a clandestine meeting. The plurality of live action events, in turn, may define the video data, which may be generated at the video camera (block 303).

In certain exemplary embodiments, the computing device may be further trained so as to be operative to distinguish between normal and anomaly simulations. More particularly, the computing device may generate synthetic data defined by at least one normal simulation and at least one anomaly simulation (block 305) and then classify the normal simulation and the anomaly simulation as normal or anomaly (block 306). In some embodiments, the computing device may aim to accurately distinguish whether the normal simulation and the anomaly simulation are normal or anomaly. Normal may mean standard, regular, ordinary, or even, non-concerning. On the other hand, anomaly may mean non-standard, including a crime, medical emergency, or natural disaster. Further, the computing device may receive real data defined by at least one normal incident and at least one anomaly incident (block 307) and then classify the normal incident and the anomaly incident as normal or anomaly (block 308).

Once the computing device has been trained to accurately classify the normal and anomaly simulations and incidents as anomaly or normal, the computing device may receive the video data from the video camera (block 309). In accordance with the same standards as for the normal and anomaly simulations and incidents, the computing device may classify the live action events as normal or anomaly (block 310). In alternate embodiments, the computing device may implement different or various standards to classify the live action events as normal or anomaly.

Finally, responsive to the computing device classifying the live action event as anomaly, the computing device may notify the appropriate authority (block 311). In certain embodiments, the appropriate authority may dependent on the type of anomaly. For instance, in embodiments wherein the anomaly may be a crime, the appropriate authority may be the police department, the fire department, or emergency medical personnel. By way of further example, in embodiments wherein the anomaly may be a natural disaster, the appropriate authority may also comprise emergency medical personnel, the fire department, or another local government agency. Even further, the appropriate authority may be a property owner, who may be own or control the video camera.

If embodied in software, it should be noted that each block depicted in the accompanying flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as the computing device 102 and the video camera 104. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

Figure 4:
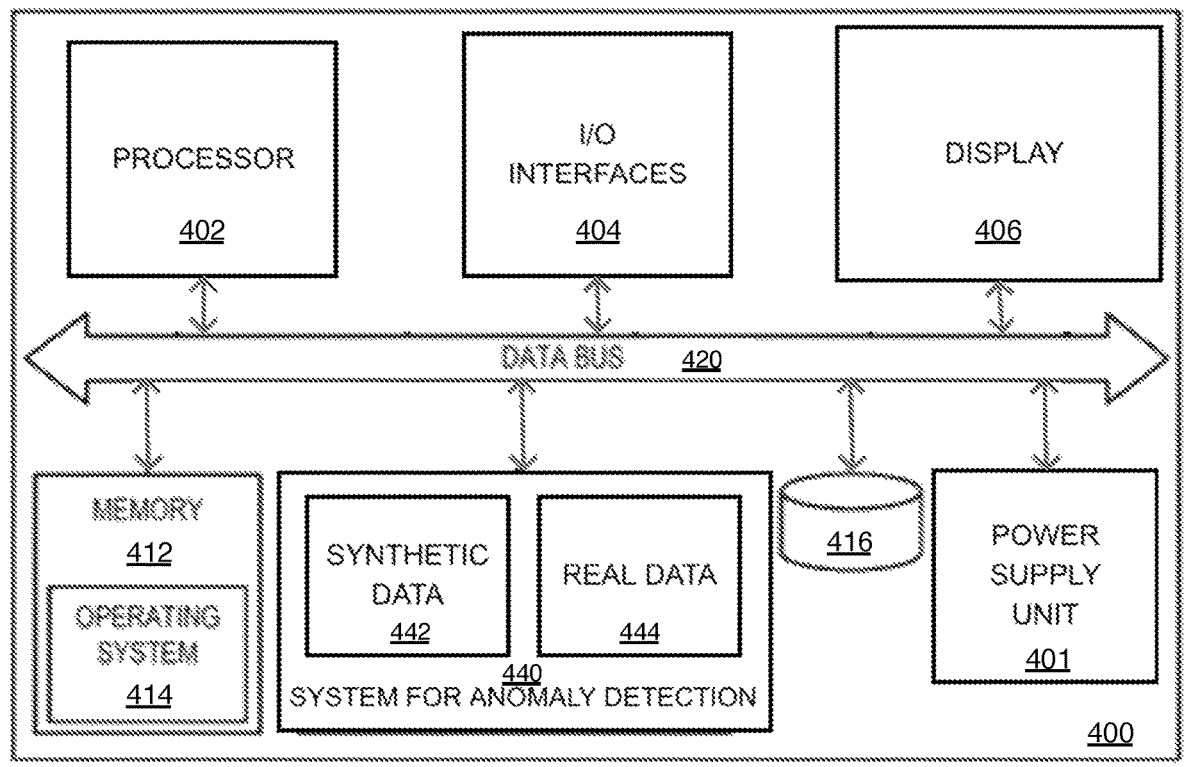
FIG. 4 shows an embodiment of the intelligent anomaly detection system.

FIG. 4 illustrates an exemplary computing device 400 configured to implement the intelligent system for anomaly detection. Computing device 400 may be a desktop computing, laptop, gaming console, or even tablet computing but may also be embodied in any one of a wide variety of wired and/or wireless computing devices known to those skilled in the art. As shown in FIG. 4, the computing device 400 may include a processing device (processor) 402, input/output interfaces 404, a display 406, a memory 412, an operating system 414, and a mass storage 416, with each communicating across a local data bus 420. Additionally, mobile device 400 may incorporate a system for anomaly detection 440, which is depicted as including synthetic data 442 and real data 444, stored locally, although the location of data 442 and 444 may vary. The computing device 400 may further comprise a power supply 401.

The processing device 402 may include any custom made or commercially available processor, a central processing unit (CPU) or an auxiliary processor among several processors associated with the computing device 400, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 412 may include any one of a combination of volatile memory elements (e.g., random-access memory (RAM, such as DRAM, and SRAM, etc.)) and nonvolatile memory elements. The memory 412 typically may comprise native operating system 414, one or more native applications, emulation systems, or emulated applications for any of a variety of operating systems and/or emulated hardware platforms, emulated operating systems, etc. For example, the applications may include application specific software which may comprise some or all the components of the computing device 400. In accordance with such embodiments, the components may be stored in memory and executed by the processing device. Note that although depicted separately, the system and method for anomaly detection 440 may be resident in memory such as memory 412.

One of ordinary skill in the art will appreciate that the memory 412 may, and typically will, comprise other components which have been omitted for purposes of brevity. It should be noted that in the context of this disclosure, a non-transitory computer-readable medium may store one or more programs for use by or in connection with an instruction execution system, apparatus, or device. The display 406 may comprise various components used to visualize the synthetic data and the real data. When such components may be embodied as an application, the one or more components may be stored on a non-transitory computer-readable medium and executed by the processor.

Figure 5:
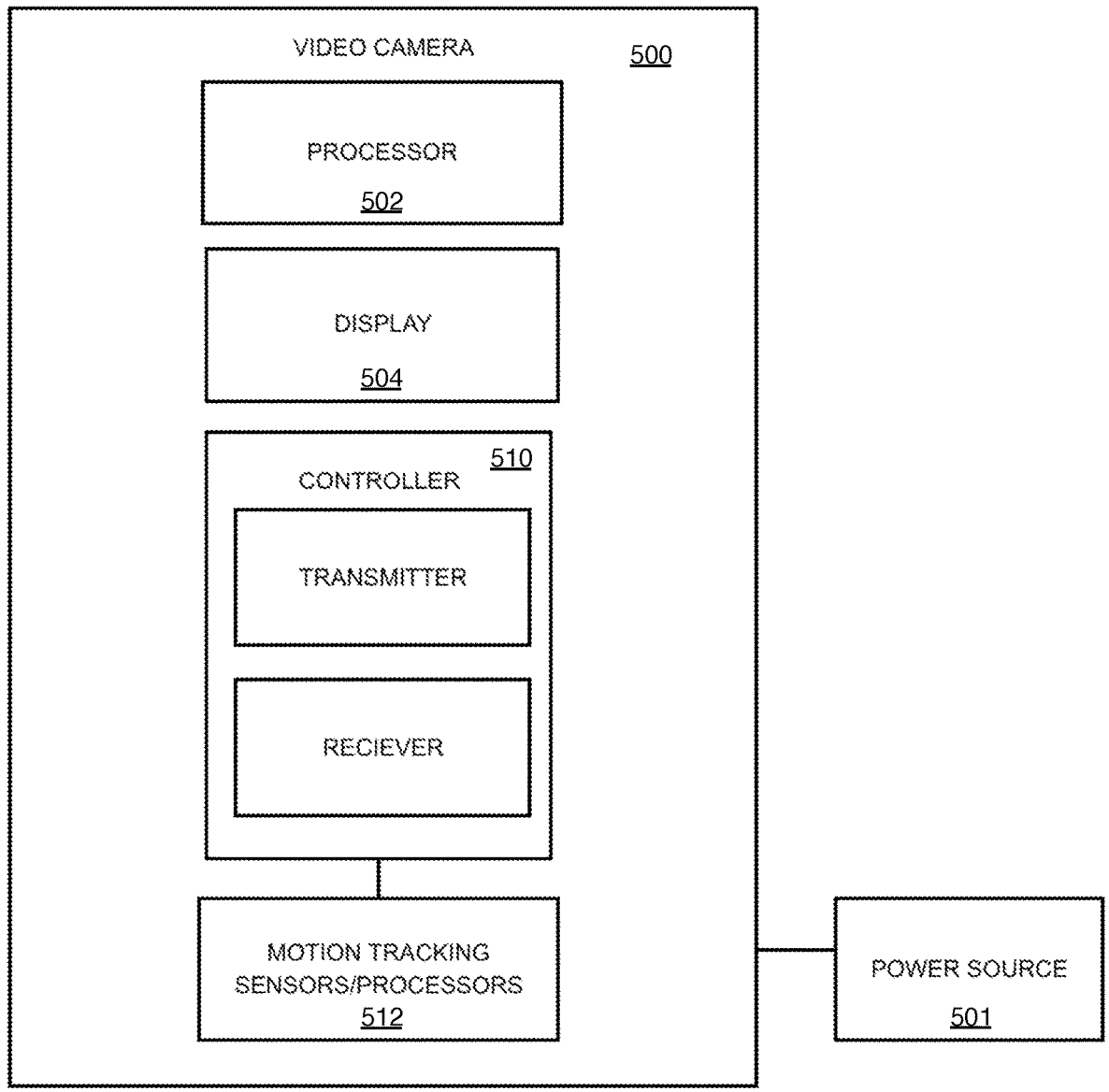
FIG. 5 shows an embodiment of the intelligent anomaly detection system.

FIG. 5 depicts an exemplary video camera 500 configured to implement the system for anomaly detection. Video camera 500 may include a processing device (processor) 502, a display 504, a controller 510 having a transmitter and receiver, and motion tracking sensors/processor 512. The processor 502 may include any custom made or commercially available processor, such as those discussed above. Moreover, the processor 502 may be operative to process the plurality of live action events and generate the video data. The motion tracking sensors/processor 512 may be operative to trigger the video camera 500 to capture the live action events. Further, the video camera 500 may be coupled to a power source 501.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, the system and method may be utilized to detect a number of anomalies, other than crimes, though crimes are primarily described throughout this disclosure. Accordingly, it is intended that the invention not be limited, except as by the appended claims.

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the intelligent anomaly detection system and method with which that terminology is associated. In general, the terms used in the following claims should not be constructed to limit the intelligent anomaly detection system and method to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the intelligent anomaly detection system and method is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the intelligent anomaly detection system and method.

What is claimed is:

1. An intelligent anomaly detection system comprising a computing device defined by
   a generator operative to
     generate synthetic data that is bias-free in terms of sex and race of a human actor defined by at least one normal simulation and at least one anomaly simulation;
     generate real data that is bias-free in terms of sex and race of the human actor defined by at least one normal incident and at least one anomaly incident;
     transmit the synthetic data and the real data to a discriminator;
   the discriminator operative to
     receive the synthetic data and the real data from the generator;
     evaluate the synthetic data and the real data; and
     classify the synthetic data and the real data as real or synthetic.

2. The system of claim 1, wherein the anomaly simulation and the anomaly incident comprise
   an environment; and
   at least one anomaly behavior.

3. The system of claim 2, wherein the anomaly simulation and the anomaly incident represent a criminal activity and wherein the at least one anomaly behavior is a criminal behavior.

4. The system of claim 1, wherein the normal simulation and the normal incident represent a normal activity comprised of an environment.

5. The system of claim 4, further comprising
   at least one normal behavior.

6. The system of claim 1, wherein the computing device is further operative to generate synthetic data defined by the at least one normal simulation and the at least one anomaly simulation;
   classify the normal simulation and the anomaly simulation as normal or anomaly;
   receive real data and wherein the real data is defined by the at least one normal incident and the at least one anomaly incident; and
   classify the normal incident and the anomaly incident as normal or anomaly.

7. The system of claim 1 or 6, further comprising
   a video camera operative to
     capture a plurality of live action events in real time;
     generate video data defined by the plurality of live action events;
     transmit the video data to the computing device; and
   wherein the computing device is further operative to
     receive and analyze the video data from the video camera;
     classify the live action events as anomaly or normal; and
     responsive to the computing device classifying the live action event as anomaly, notify an appropriate authority.

8. The system of claim 7, wherein the appropriate authority is a local police department, a local sheriff department, or a local government agency.

9. The system of claim 7, wherein the appropriate authority is a property owner corresponding to the video camera.

10. A method for anomaly detection, comprising
providing a computing device defined by a generator and a discriminator;
at the generator,
  generating synthetic data that is bias-free in terms of sex and race of a human actor defined by at least one normal simulation and at least one anomaly simulation;
  generating real data that is bias-free in terms of sex and race of a human actor defined by at least one normal incident and at least one anomaly incident;
  transmitting the synthetic data and the real data to a discriminator;
at the discriminator,
  receiving the synthetic data and the real data from the generator,
  evaluating the synthetic data and the real data; and
  classifying the synthetic data and the real data as real or synthetic.

11. The method of claim 10, wherein the synthetic data resembles the real data.

12. The method of claim 10, further comprising
providing a video camera,
at the video camera,
  capturing a plurality of live action events in real time;
  generating video data defined by the plurality of live action events;
  transmitting the video data to the computing device;
at the computing device,
  generating synthetic data defined by at least one normal simulation and at least one anomaly simulation;
  classifying the normal simulation and the anomaly simulation as normal or anomaly;
  receiving real data defined by at least one normal incident and at least one anomaly incident;
  classifying the normal incident and the anomaly incident as normal or anomaly;
  receiving the video data from the video camera;
  classifying the live action events as normal or anomaly; and
  responsive to an anomaly live action event, notifying an appropriate authority.

13. A non-transitory, tangible computer-readable medium having stored thereon computer-executable instructions, which, when executed by a computer processor, enable performance of a method comprising:
providing a computing device;
generating, at a generator, synthetic data that is bias-free in terms of sex and race of a human actor defined by at least one normal simulation and at least one anomaly simulation;
transmitting, at the generator, the synthetic data to a discriminator;
receiving, at the discriminator, the synthetic data from the generator, evaluating, at the discriminator, the synthetic data and the real data; and
classifying, at the discriminator, the synthetic data and the real data as real or synthetic.

14. The medium of claim 13, wherein the method further comprises
capturing, at a video camera, a plurality of live action events in real time;
generating, at the video camera, video data defined by the plurality of live action events;
transmitting, at the video camera, the video data to the computing device;
receiving, at the computing device, the video data from the video camera;
classifying, at the computing device, the live action events as anomaly or normal; and
responsive to a classification of the live action events as anomaly at the computing device, notifying an appropriate authority.

15. The medium of claim 13 or 14, wherein the method further comprises
generating, at the computing device, synthetic data defined by at least one normal simulation and at least one anomaly simulation;
classifying, at the computing device, the normal simulation and the anomaly simulation as normal or anomaly;
receiving, at the computing device, real data defined by at least one normal incident and at least one anomaly incident; and
classifying, at the computing device, the normal incident and the anomaly incident as normal or anomaly.

* * * * *